May 7, 1929.  W. J. KING  1,711,534
SEAT INDICATING SYSTEM
Filed Aug. 12, 1927    2 Sheets-Sheet 1
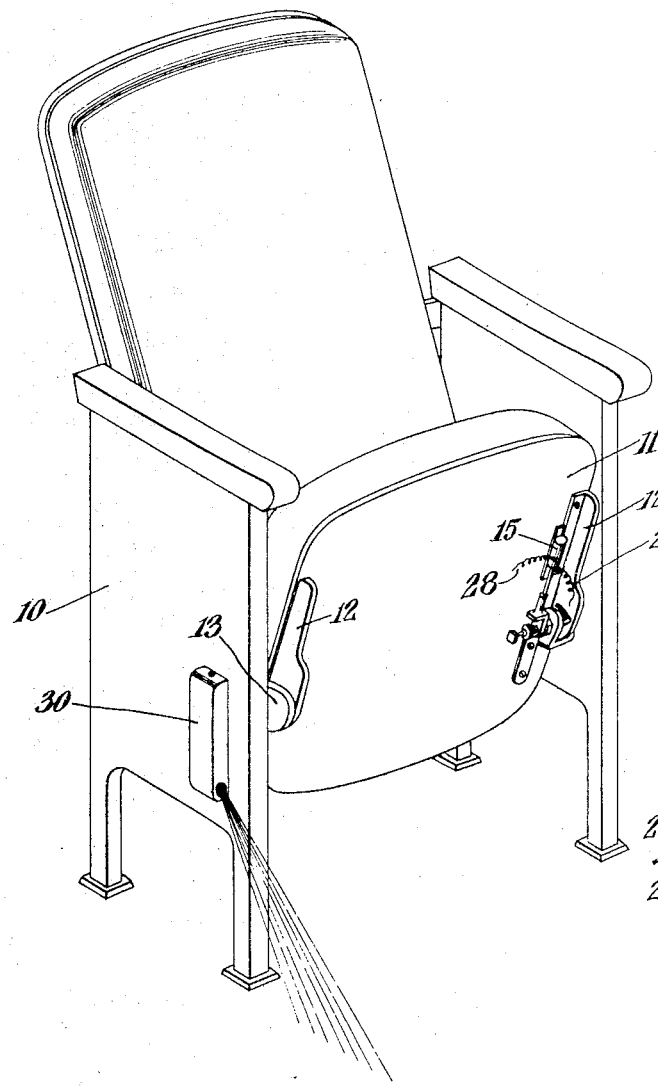
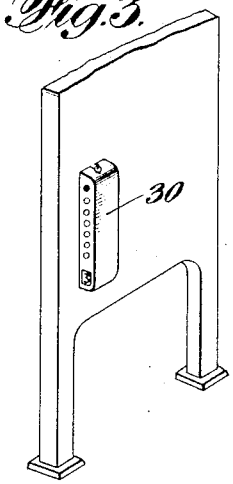
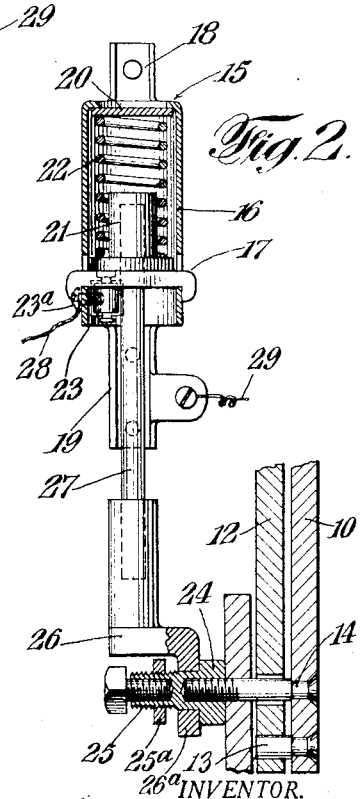
INVENTOR.
William J. King
BY Kenyon & Kenyon
ATTORNEYS.

May 7, 1929.  W. J. KING  1,711,534
SEAT INDICATING SYSTEM
Filed Aug. 12, 1927   2 Sheets-Sheet 2
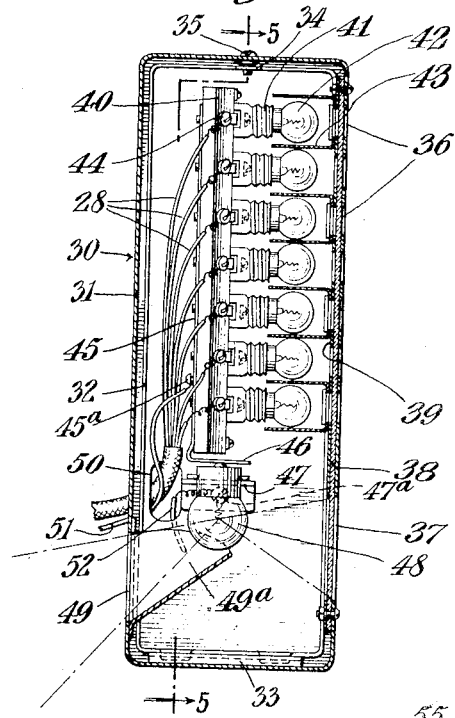
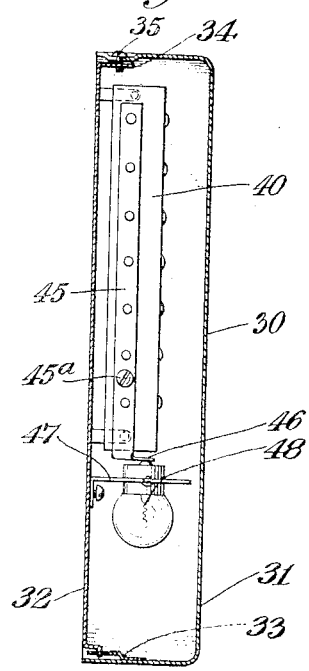
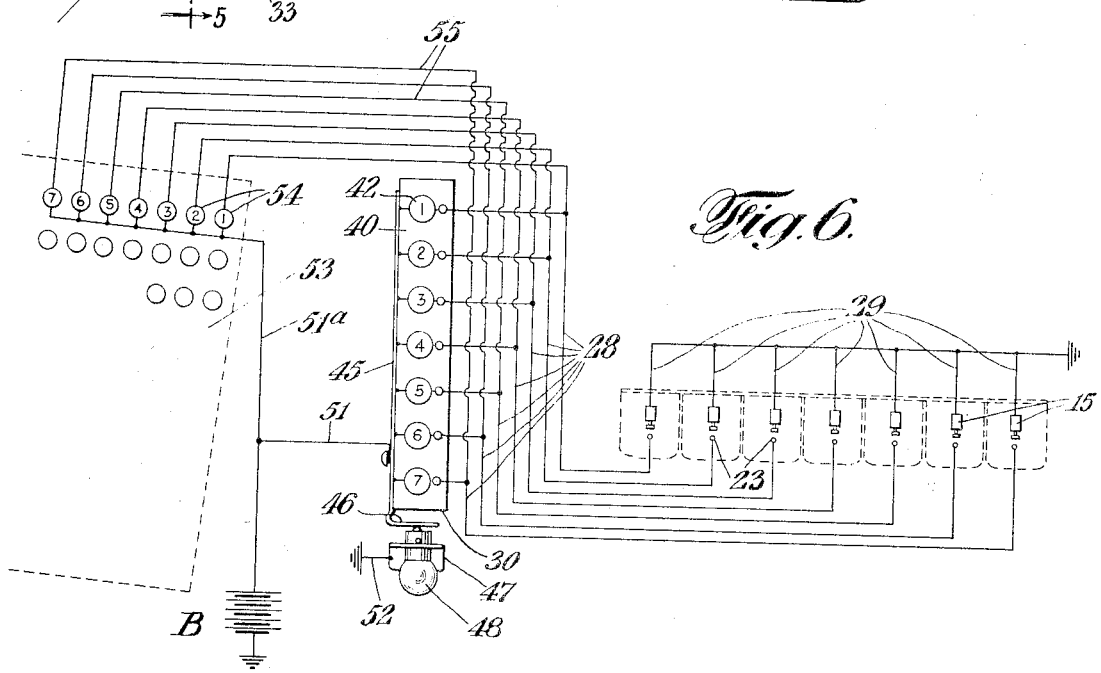
William J. King INVENTOR.
BY Kenyon & Kenyon
ATTORNEYS.

Patented May 7, 1929.

1,711,534

UNITED STATES PATENT OFFICE.

WILLIAM J. KING, OF EAST ORANGE, NEW JERSEY, ASSIGNOR TO BILMARJAC CORPORATION, OF NEW YORK, N. Y., A CORPORATION OF DELAWARE.

SEAT-INDICATING SYSTEM.

Application filed August 12, 1927. Serial 212,416.

This invention relates to systems for indicating vacant seats in a theatre. Such systems usually comprise a main indicator equipped with lights corresponding to the theatre seats and an aisle indicator for each row of seats equipped with lights corresponding to the various seats in the row. The circuit for these lights is controlled by a switch operated by the seat. Thus when a seat is occupied the circuit for the lamps corresponding to such seats is broken but when the seat is unoccupied the circuit is closed and the lamps lighted, thus indicating the vacant seat.

An object of this invention is an improved means for controlling the lamp circuits and also an improved seat indicator for use at the end of each row of seats.

According to this invention the circuit controlling means or seat operated switch comprises a cylindrical metallic casing closed at one end and provided with a piston between which and the closed end is provided a coil spring. A contact member is insulatingly mounted in the casing in position to be engaged by the piston under the influence of the spring. The casing is firmly fastened to the seat and means are provided for moving the piston out of engagement with the contact member when the seat is occupied. This means comprises a plunger having one end pivotally supported by the seat frame and the other end engaging the piston. The pivotal connection between the plunger and seat frame is offset from the axis of rotation of the seat so that the lifting or lowering of the seat permits movement of the piston. Preferably the casing is grounded and the contact member is connected through the indicating lamps with the positive pole of a source of electrical energy. The spring is of sufficient strength that when a seat is unoccupied the spring forces the piston into engagement with the contact member and raises slightly the seat.

The aisle box at the end of each row of seats comprises a casing with apertures corresponding to the seats in the row. A lamp is provided for each aperture and is suitably connected with the switch of the corresponding seat. These apertures are so arranged that when the indicator is attached to the aisle seat of a row of seats the lamps are visible from the rear of the theatre. There is also provided an illuminated character designating the number of the row of seats to which the indicator is applied and in connection with this indicator there is provided a lamp which is lighted at all times but which is shielded from the seat indicating apertures. Opposite the above mentioned apertures there is provided an additional aperture through which light is directed from the last mentioned lamp to the space between the rows so that a person entering the row may see whether or not there is a step up or down or the aisle and row of seats are at the same level. This illumination of the space between rows prevents stumbling on the part of a person entering a row.

Other objects, novel features and advantages of this invention will be apparent from the following specification and accompanying drawings wherein:

Figure 1 is a perspective view of a theater seat equipped with a switch embodying the invention;

Figure 2 is an enlarged view partly in section, of the switch mechanism;

Figure 3 is a perspective view of a portion of a seat frame showing the aisle indicator;

Figure 4 is a vertical section through the aisle box;

Figure 5 is a section on the line 5—5 of Fig. 4; and

Figure 6 is a wiring diagram of the system.

Referring now to Fig. 1, 10 designates the frame or stanchion from which is supported the seat 11. The seat 11 is attached to arms 12 which are pivoted to the frame 10 at 13. A post 14 mounted on the frame 10 extends through a curved slot in the arm 12 and serves to limit the downward or upward movement of the seat. This is a common type of theatre seat structure.

To the under face of the seat is attached a switch 15, part of which comprises a metal blank stamped to form cylindrical casing 16 having flat projecting end portions. Near one end of the casing a tie member 17 extends through apertures and its ends project over the edges of the apertures to hold together the edges of the blank. Projections 18 and 19 at the ends of the casing provide means for attaching the latter to the seat, these projections being equipped with apertures through which screws are passed. The end of the casing remote from the member 17 is closed by a disc or plate 20. Within the casing is arranged a piston 21 and between the piston 21 and the member 20 is provided a helical spring 22 which normally presses the piston 21 into contact with the member 17 which acts as a stop. Near the member 17, a contact member 23 is insulatingly mounted on the casing. A stud 24 is threaded on the end of the post 14 and replaces the nut commonly used. This stud is provided with a hollow extension 25 which is threaded both interiorly and exteriorly. The extension 25 passes through an aperture in the offset ear 26ª of a member 26, the body of which is provided with a socket to receive one end of a plunger 27, the other end of which extends into a socket in the piston 21. On the stud 25 is provided a lock nut 25ª which prevents movement of the member 26 axially of the stud. The pin 14 is offset relative to the axis of the seat 11 so that the casing 16 moves toward and away from the post 14 as the seat 11 is raised and lowered. The piston 21 is therefore caused to move back and forth in the casing 16 by the plunger 27 and the spring 22. When the seat is all the way down as when occupied, the piston 21 is held out of engagement with the contact 23, but when the seat is raised it engages therewith. The spring 22 is of sufficient strength that when the seat is not occupied, the spring lifts the seat and brings the piston 21 into engagement with the contact 23. As shown in Fig. 1, a wire 28 is connected to the contact 23 by the screw 23ª and a wire 29 is connected to the ear on the projection 19, which wires are part of a circuit later to be described. Thus when the seat is raised, this circuit is closed, and when the seat is lowered, the circuit is broken.

An indicator 30 is provided on each aisle seat of a row of seats as shown in Figs. 1 and 3. This indicator comprises a box having a body 31 and a removable back 32. To the bottom of the body 31 is attached a strip of metal 33 having an offset portion in which are provided one or more slots to receive ears projecting from the bottom edge of the back 32. At the top edge of the back 32 there is provided an inwardly extending ear 34 in which is mounted a screw 35 arranged to slide into a groove provided in the box 31. By means of the screw and the ears and slots the back and the body may be attached. In the rear wall of the body (Fig. 3) there is provided a series of small vertical apertures 36 and below them a large aperture 37. These apertures are covered by a strip of translucent material 38, which is held in position by a metal strip 39 having corresponding apertures. A strip 40 of insulating material is supported by the back 32 and upon this strip and in alignment with the apertures 36 are mounted lamp sockets 41 in which sockets are inserted the lamps 42. Shields 43 are carried by the strip 39 and are so arranged with respect to the lamps 43 that only the aperture directly in alignment with each lamp is illuminated thereby. A series of binding posts 44, one for each lamp socket, is provided, each binding post being connected to one terminal of a socket. A bus bar 45 is mounted on the back of the member 40 and the remaining terminal of each of the lamp sockets is connected thereto. The lower end of the bus bar 45 is bent under the end of the member 40 to form a contact 46. A metallic shelf 47 extends from the back 32 below the contact 46 and is apertured to receive the base of a lamp 48 which is positioned in back of the aperture 37. Opposite the aperture 37 and in the front wall (Fig. 1) there is provided another aperture 49 through which light may pass from the lamp 48. A shield 49ª extends from the aperture 49 toward the lamp 48.

The indicator 30 is so mounted on the frame 10 that the apertures 36 and 37 face the rear of the theatre and the aperture 49 faces the front of the theatre. Thus, when any one of the lamps 42 is lighted, it may be seen from the rear of the theatre. In order to identfy the particular row, an opaque designating character or the like is mounted on the translucent member 38 in alignment with the aperture 37 as shown in Fig. 3. This character is also visible from the rear of the theatre. As shown in Fig. 1, light passing from the lamp 48 through the aperture 49 illuminates the space directly in front of the aisle seat of a row of seats.

A cable made up of several wires leads into the indicator box through an aperture 50. One of these is a feed wire 51 leading from a source of current $b$ and is connected to the bus bar 45 by the screw 45ª. Other wires 28 lead from the binding posts 44 to the contacts 23 of the switches 15, the casing 16 of which is grounded by wires 29. A wire 52 is connected to the shelf 47 by a screw 47ª and leads to ground. Thus, when any one of the seats in a row is unoccupied, the spring 42 forces the piston 21 into engagement with the contact 23, thus closing the circuit comprising feed wire 51, wire 28 leading to the lamp 42 corresponding to the unoccupied seat, lamp 42 and ground wire 29. The lamp 48 is lighted at all times by means of a circuit including feed wire 51, bus bar 45, the end 46 of which engages the center contact of the lamp 48, shelf 47 which engages the surface contact of the lamp and ground wire 52. In addition to the aisle indicator, there is provided a central or master indicator 53 arranged in some convenient portion of the theatre. This indicator is equipped with lamps 54 corresponding to seats of the theatre and is in effect a seating diagram of the theatre. A feed wire 54 conveys current from the source $b$ to suitable bus bars or the like which are connected to one set of terminals of the lamps 54, the other terminals of which are connected by wires 55 with the wires 28 leading from the lamps 42 corresponding to the lamps 54. The entire system is disclosed diagrammatically in Fig. 6 by reference to which the operation of the entire system is evident.

Whenever a seat is unoccupied, the spring 22 lifts it sufficiently to bring the piston 21 into engagement with the contact 23, thereby causing lamps 54 and 42 corresponding to such seats to be lighted. The lighting of the lamps 54 permits direction of patrons to that section of the theatre where there are vacant seats and the lamps 42 indicate the vacant seats in any particular row. This insures quick detection of the vacant seats and dispenses to a large extent with the services of ushers. Light from the lamps 48 at all times illuminates the space directly in front of the aisle seat so that a patron may see whether or not there is a step leading from the aisle to the floor of the row of seats. Stumbling and like accidents are thus prevented but the light does not interfere with viewing a performance on the stage as the light is directed downwardly only. The switch mechanism is arranged on the under part of the seat where it is completely out of the way so that there is little or no opportunity for patrons to strike against it and injure it or catch it with overcoats, umbrellas or the like. Also because of its position, the wires leading to and from the switch mechanism are out of the way.

I claim:

1. In a seat-indicating system an aisle box containing a plurality of signal lights each shielded from the other, means for controlling each light from the seat corresponding thereto, a light positioned near the bottom of said box and an aperture in said box covered by a transparent screen bearing an opaque character rendered visible by said light.

2. In a seat-indicating system an aisle box containing a plurality of signal lights each shielded from the other, means for controlling each light from the seat corresponding thereto, a light positioned near the bottom of said box, an aperture in the rear wall of said box, an opaque designating character arranged in said aperture and rendered visible by said light and an aperture in the opposite wall for permitting said light to illuminate the entrance to a row of seats.

3. In a seat-indicating system an aisle box containing a plurality of signal lights each shielded from the other, means for controlling each light from the seat corresponding thereto, a light positioned near the bottom of said box, an indicator in the rear wall of said box rendered visible by said light and an aperture in the front wall of said box for permitting said light to illuminate the entrance to a row of seats.

4. In a seat-indicating system an aisle box, a plurality of lamps mounted therein and shielded from each other, apertures in one wall of said box in alignment with said lamps and means for controlling each lamp by operation of a seat corresponding thereto, said apertures being so arranged that the signal lamps are visible from the rear of the theatre only, an additional aperture in said wall, an opaque designating character arranged therein and a lamp for rendering visible said character.

5. In a seat-indicating system an aisle box having a plurality of signal lights visible from the rear of the theatre, means operated by seats corresponding to said lamps for controlling their illumination, a light in said box, an indicator in the rear wall of said box rendered visible by said light and an aperture in the front wall of said box for permitting said light to illuminate the entrance to a row of seats.

6. In a seat-indicating system, an aisle box having an illuminated character visible from the rear of the theatre, a lamp in said box for illuminating said character and an aperture in the front wall of said box for permitting light from said lamp to illuminate the entrance to a row of seats.

7. In a system for indicating vacant seats in a row of seats, an aisle box provided with a plurality of signal lamps, an additional lamp in said box and an indicating character rendered visible by light from said last named lamp.

8. In a system for indicating vacant seats in a row of seats, an aisle box provided with a plurality of signal lamps, means operated by seats corresponding to said lamps for controlling the illumination thereof, an additional lamp in said box and an indicating character rendered visible by light from said last named lamp.

9. In a system for indicating vacant seats in a row of seats, an aisle box provided with a plurality of signal lamps, an additional lamp in said box, an indicating character rendered visible by light from said last named lamp and an aperture in a wall of said box for permitting light from said lamp to illuminate the entrance of a row of seats.

10. In a system for indicating vacant seats in a row of seats, an aisle box provided with a plurality of signal lamps, means operated by seats corresponding to said lamps for controlling the illumination thereof, an additional lamp in said box, an indicating character rendered visible by light from said last named lamp and an aperture in a wall of said box for permitting light from said lamp to illuminate the entrance to a row of seats.

11. In a system for indicating vacant seats in a row of seats, an aisle box, a vertical insulating member mounted therein, a plurality of lamp sockets carried by said insulating member in vertical alignment, apertures in one wall of said box in register with said sockets, shields surrounding said apertures and projecting from said wall toward said insulating member, a bus bar vertically mounted on said strip and having its lower end bent to extend across the lower end of said insulating member, electrical connections between said bus bar and said sockets, an apertured plate supported by a wall of the box and extending beneath the bent end of the bus bar, said plate and bent end of the bus bar constituting a lamp socket, an additional aperture in said first wall below the first mentioned apertures, a designating character supported in said aperture, an aperture in another wall of said box and substantially opposite said last named aperture and a shield partially surrounding said aperture and extending toward said plate.

12. In a system for indicating vacant seats in a row of seats, an aisle box, a vertical insulating member mounted therein, a plurality of signal lamps mounted on said member, a bus bar vertically mounted on said insulating member and having its lower end bent to extend across the lower end of said insulating member, electrical connections between said bus bar and said sockets, an apertured plate supported by a wall of the box and extending beneath the bent end of the bus bar, said plate and bent end of the bus bar constituting a lamp socket, and an indicating character rendered visible by light from the lamp supported in said last named socket.

13. In a system for indicating vacant seats in a row of seats, an aisle box, a vertical insulating member mounted therein, a plurality of signal lamps mounted on said member, a bus bar vertically mounted on said insulating member and having its lower end bent to extend across the lower end of said insulating member, electrical connections between said bus bar and said sockets, an apertured plate supported by a wall of the box and extending beneath the bent end of the bus bar, said plate and bent end of the bus bar constituting a lamp socket, an indicating character rendered visible by light from the lamp supported in said last named socket and an aperture in a wall of said box for permitting light from said lamp to illuminate the entrance to a row of seats.

In testimony whereof, I have signed my name to this specification.

WILLIAM J. KING.